(12) United States Patent
Fratta et al.

(10) Patent No.: US 7,063,198 B2
(45) Date of Patent: Jun. 20, 2006

(54) COUPLING DEVICE AND IMPROVED FLUID PRESSURE SYSTEM THEREFOR

(75) Inventors: Celso L. Fratta, Marshall, MI (US); Robert J. Kyle, Battle Creek, MI (US); Keith E. Morgensai, Marshall, MI (US); Patrick J. McMillan, Battle Creek, MI (US)

(73) Assignee: Eaton Corporation, Cleveland, OH (US)

( * ) Notice: Subject to any disclaimer, the term of this patent is extended or adjusted under 35 U.S.C. 154(b) by 78 days.

(21) Appl. No.: 10/964,134

(22) Filed: Oct. 13, 2004

(65) Prior Publication Data

US 2006/0076209 A1     Apr. 13, 2006

(51) Int. Cl.
*F16D 25/0638*    (2006.01)
*F16D 25/12*      (2006.01)
*F16H 48/22*      (2006.01)

(52) U.S. Cl. .............................. 192/85 AA; 192/103 F; 475/88

(58) Field of Classification Search ............ 192/103 F; 475/88
See application file for complete search history.

(56) References Cited

U.S. PATENT DOCUMENTS

| | | | | |
|---|---|---|---|---|
| 5,938,555 A | * | 8/1999 | Leeper | 475/88 |
| 5,964,126 A | | 10/1999 | Okcuoglu | 74/650 |
| 6,041,903 A | * | 3/2000 | Burns et al. | 192/85 AA |
| 6,176,800 B1 | * | 1/2001 | Shaffer et al. | 475/88 |
| 6,280,613 B1 | | 8/2001 | Morse et al. | 210/168 |
| 6,464,056 B1 | | 10/2002 | Lowell et al. | 192/35 |
| 6,524,364 B1 | * | 2/2003 | Ederyd | 75/240 |
| 2005/0194231 A1 | * | 9/2005 | Babin | 192/85 AA |

* cited by examiner

*Primary Examiner*—Richard M. Lorence
(74) *Attorney, Agent, or Firm*—L. J. Kasper

(57) ABSTRACT

A coupling device (11) of the type including a clutch assembly (29) actuation of which is responsive to fluid pressure in a clutch piston apply chamber (43), and a series of fluid passages (53,55,57,59) communicating the chamber to a control valve assembly (69). A housing (15) defines a hub portion (61) surrounded by a plenum member (17) carrying two high pressure seals (63;163). The housing is formed such that the outer surface (60) of the hub portion is free of graphite porosity, to improve the life of the seals. Preferably, each of the seals (63;163) has a height/width ratio selected to provide the desired radially inward sealing force, but wherein the seals are still able to be assembled within the respective seal cavities (73,75;173,175).

12 Claims, 6 Drawing Sheets

COUPLING DEVICE AND IMPROVED FLUID PRESSURE SYSTEM THEREFOR

BACKGROUND OF THE DISCLOSURE

The present invention relates to coupling devices of the type used to transmit torque, for example, in a vehicle drive line, and more particularly, to such coupling devices of the type including a fluid pressure operated clutch assembly for controlling the transmission of torque through the coupling device.

As used herein, the term "coupling device" will be understood to mean and include a device which is able to transmit torque from an input to one or more outputs, and in which there is a clutch assembly disposed between the input and the output, such that the amount of torque transmitted is a function of the extent of engagement of the clutch assembly. Within the scope of the present invention, the term "coupling device" means and includes both gear-type devices (such as differentials), as well as gearless-type couplings.

Although the present invention may be utilized with many different types and configurations of coupling devices such as a coupling made in accordance with the teachings of U.S. Pat. No. 5,964,126 assigned to the assignee of the present invention and incorporated herein by reference, it is especially advantageous when utilized in conjunction with vehicle differentials of the general type illustrated and described in U.S. Pat. Nos. 5,310,388 and 6,464,056, both of which are also assigned to the assignee of the present invention and incorporated herein by reference.

In the differential coupling devices of the cited patents, there is a clutch pack operable to transmit torque between the input (housing connected to the ring gear) and the output (one of the axle shafts), with the degree of engagement of the clutch pack being determined by the fluid pressure in a clutch apply chamber. The fluid pressure biases a clutch engagement member (such as a piston) against the clutch pack. The differential coupling devices of the cited patents include a gerotor pump having one rotor fixed to rotate with the input, and the other rotor fixed to rotate with the output, such that the flow of pressurized fluid into the clutch apply chamber is generally proportional to the speed difference between the input and the output. As used herein, the term "clutch pack" will be understood to mean and include both a multiple friction disc type clutch pack, as well as any of the other well known types of clutch assemblies, such as cone clutches, in which the degree of engagement is generally proportional to the fluid pressure acting on the clutch piston, or on an equivalent clutch-engagement structure.

In differential coupling devices of the type described above, it is typical to provide a flow path from the clutch apply chamber to a reservoir or some other source of low pressure fluid, and to provide, as part of this "main" flow path, some sort of control valve which can control the flow from the clutch piston chamber to the low pressure source, thereby controlling the pressure in the clutch apply chamber, and therefore, controlling the "bias torque", i.e., the extent to which torque is transmitted from the input to the output. It is also known, and within the scope of the present invention for the "main" flow path to communicate from a low pressure inlet (receiving fluid from a reservoir) to the inlet to the gerotor pump, and to have a control valve disposed in that flow path, thus controlling clutch apply pressure by limiting fluid flow into the inlet of the pump.

One of the problems associated with differential coupling devices of the type to which the present invention relates is that the housing of the coupling device typically rotates at approximately the speed of rotation of the axles, whereas the control valve and its associated structure, which must be operably associated with the coupling housing, must be stationary. Thus, there are references hereinafter to the "stationary control valve assembly", as that term will be better understood subsequently, and which would typically, but not necessarily, include both a plenum member and a control valve. Therefore, at some location on the interface between the coupling housing and the control valve assembly, there is a need for a sealing arrangement which is capable of withstanding both the fairly high fluid pressure which is present in the high pressure side of the system, as well as the relatively high speeds of rotation of the coupling housing. By way of example only, in the commercial embodiment of the coupling device which has been developed by the assignee of the present invention, the fluid pressure in the high pressure portion of the system is typically in the range of about 500 psi to about 1000 psi, while the coupling housing may be rotating, relative to the stationary control valve assembly, at speeds in excess of 1500 rpm, corresponding to a vehicle speed of about 130 mph.

As has been well known to those skilled in the art of such coupling devices, the housing ("differential case") has conventionally comprised one or more cast iron members, with any surfaces needing a particular flatness, smoothness, etc. being machined, while the rest of the member remains in the "as-cast" condition. In the commercial embodiment of the invention, as developed by the assignee of the present invention, the plenum and seal arrangement, which comprises part of the control valve assembly, is configured generally as in the above-incorporated U.S. Pat. No. 6,464,056, with a pair of high pressure seals received within the plenum and riding on the cylindrical surface of the housing hub portion. It has been observed, during the early stages of the development of the commercial embodiment, that the seal life of the high pressure seals was not nearly acceptable, but the reasons for the insufficient seal life were not at all apparent.

Although it was believed at the time that the surface of the cylindrical hub portion was satisfactory for engagement with the rotating high pressure seals, it has since been hypothesized that a condition which will be referred to hereinafter as "graphite porosity" was resulting in the cylindrical surface having small voids or porous locations, such that the surface, rather than being smooth, was actually serving to cut the sealing surface of the high pressure seals, as the hub portion rotated within the stationary seals. It is believed, based upon the observation of the parts tested during the development of the present invention, that the "graphite porosity" occurs because the seal being used includes a sealing element disposed in contact with the surface of the hub portion wherein the sealing element comprises a glass-fiber-reinforced member. As a result, when the seal and hub portion reach normal operating temperatures (in the range of about 200 to about 300 degrees F.), glass fibers from the sealing element project out of the element and are able to engage the graphite nodules as the hub portion rotates relative to the sealing element. Such engagement causes the graphite nodules to be pulled out of the surface of the hub portion, leaving pits in the surface (hence the term graphite "porosity").

It has further been observed that the resulting pits or porosity on the surface of the hub portion subsequently collect pieces of the glass fibers, which thereafter may act as little "cutting tools" against the inside diameter of the sealing element, as the hub portion rotates within the seal assembly, and/or, it may be that the exposed edges of the pits act to cut the inside diameter of the sealing element. It is the above-described cutting action by either the glass fibers, or the edges of the pits, on the sealing element which is believed to be responsible for the observed, unsatisfactory sealing life, wherein the high pressure which the seals are able to maintain may rapidly decrease over a fairly short period of time.

BRIEF SUMMARY OF THE INVENTION

Accordingly, it is an object of the present invention to provide an improved coupling device having a substantially improved high pressure sealing arrangement between the rotating coupling housing and the stationary control valve assembly, which will overcome the above-described problem, which has lead to insufficient seal life.

It is a more specific object of the present invention to provide such an improved coupling device wherein the surface of the coupling housing upon which the high pressure seals are engaged is formed to eliminate, or at least, substantially reduce the condition identified as graphite porosity, and therefore substantially improve the life of the high pressure seals.

It is a further, related object of the present invention to provide an improved coupling device having a substantially improved sealing assembly which results in a very compact, efficient stationary plenum and high pressure sealing arrangement for sealing against a rotating hub portion.

The above and other objects of the invention are accomplished by the provision of a coupling device including a rotatable housing defining a clutch cavity. A clutch assembly is disposed in the clutch cavity and includes a first clutch member fixed to rotate with the housing and a second clutch member fixed to rotate with an output. The housing defines a pressure chamber and a clutch apply member disposed in the pressure chamber and being operable to bias the first and second clutch members into torque-transmitting relationship in response to the presence of pressurized fluid in the pressure chamber. The coupling device includes a source of the pressurized fluid, and a control valve assembly operable to vary the fluid pressure in the pressure chamber in response to variations in an input. The housing defines a hub portion defining an outer cylindrical surface, the housing defining a high pressure fluid passage providing fluid communication from the pressure chamber to a first port formed in the outer cylindrical surface.

The improved coupling device is characterized by a stationary plenum member defining an inner cylindrical surface disposed in a surrounding relationship about the outer cylindrical surface defined by the hub portion. The plenum member defines a high pressure fluid passage providing fluid communication from a second port formed in the inner cylindrical surface, in fluid communication with the first port formed in the outer cylindrical surface of the hub portion, to the control valve assembly. First and second annular seal members are disposed within the inner cylindrical surface on axially opposite sides of the second port, to define an annular pressure region. The hub portion of the housing comprises a member in which at least the outer cylindrical surface is substantially free of graphite porosity.

DETAILED DESCRIPTION OF THE PREFERRED EMBODIMENT

Figure 1:
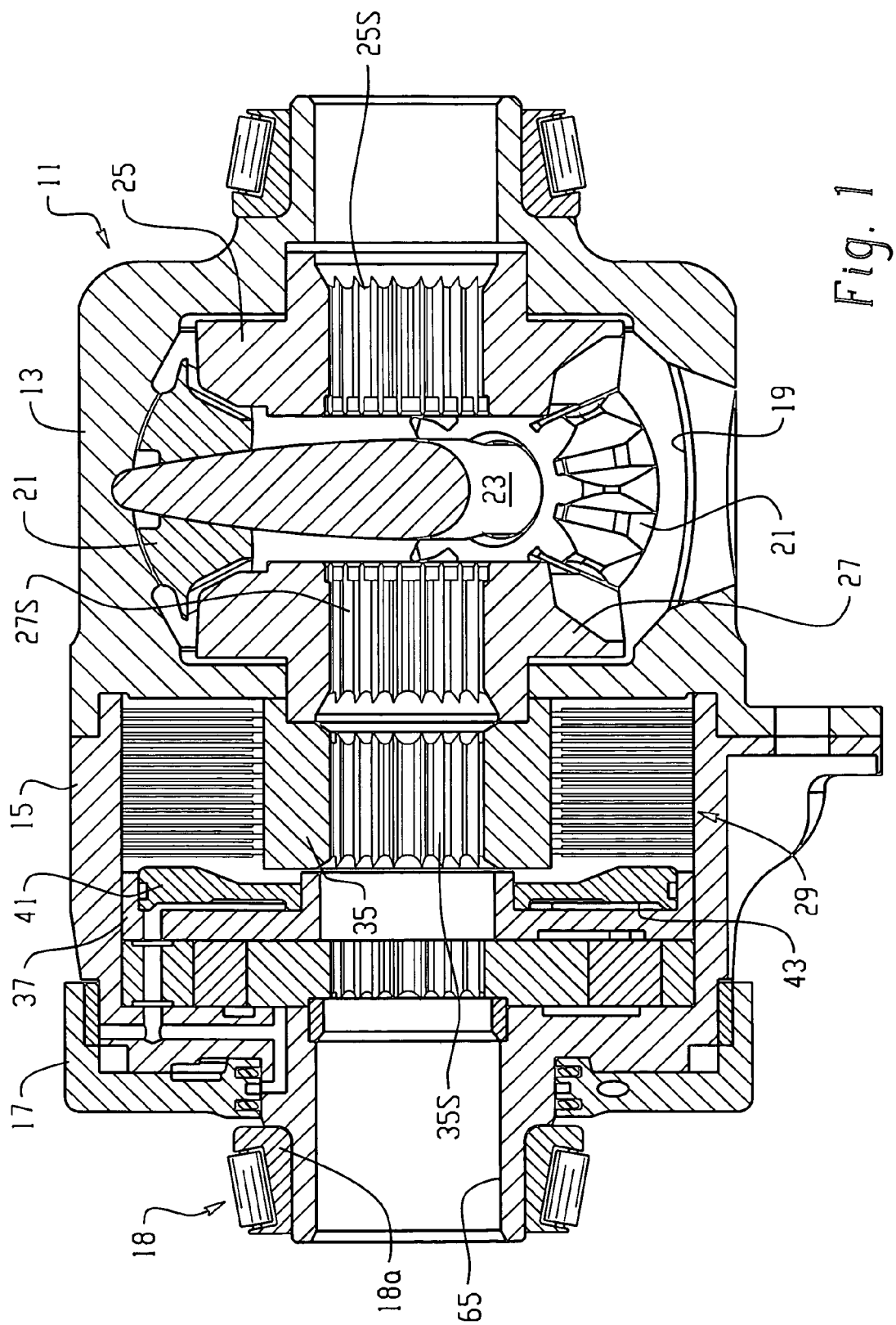
FIG. 1 is an axial cross-section of a vehicle differential coupling device of the type with which the present invention may be utilized.

Referring now to the drawings, which are not intended to limit the invention, FIG. 1 illustrates a differential coupling device, generally designated 11, for use in a vehicle drive line, and which is of the general type illustrated and described in the above-incorporated patents, and which is especially well suited to utilize, and benefit from, the improved fluid pressure system of the present invention. The differential coupling device 11 comprises a housing, including a gear housing 13, a clutch housing 15, and a valve housing 17, also referred to hereinafter as a "control valve assembly". The gear housing 13 and the clutch housing 15 may be held together by any suitable means, well known in the art, such as a plurality of bolts (not shown herein). The valve housing 17 is typically retained, axially, by an inner race 18a of a bearing set 18.

Referring still to FIG. 1, the gear housing 13 defines a gear chamber 19, and disposed therein, but by way of example only, there may be provided a typical differential gear set. In the subject embodiment, there is included a pair of input pinion gears 21, rotatably mounted relative to a pinion shaft 23, the pinion gears 21 being in toothed engagement with a pair of side gears 25 and 27. In the subject embodiment, and again by way of example only, the input pinion gears 21 (along with the housings 13 and 15) may be considered the "input" to the differential coupling device 11, while the side gears 25 and 27 comprises the "outputs" of the coupling device 11. More specifically, for purposes of most of the subsequent description, the side gear 27 will be considered to comprise the "output" of the coupling device 11. As will be understood by those skilled in the art, the ultimate "output" of the coupling device 11 is a pair of axle shafts (not shown herein for simplicity) which would be in splined engagement with the side gears 25 and 27, as will be described further subsequently.

The side gears 25 and 27 define sets of straight, internal splines 25S and 27S, respectively, which are adapted to receive the right and left axle shafts mentioned previously, whereby the coupling device 11 transmits torque by means of the axle shafts to associated vehicle drive wheels (also not shown), in a manner which is well known, and forms no part of the present invention. It should be clearly understood, however, that the structure described hereinabove is by way of example only, and the present invention may also be used with various other types of coupling device structures. In fact, the fluid pressure system of the present invention may be used generally to control clutch apply pressure in various embodiments of coupling devices and differentials.

Figure 2:
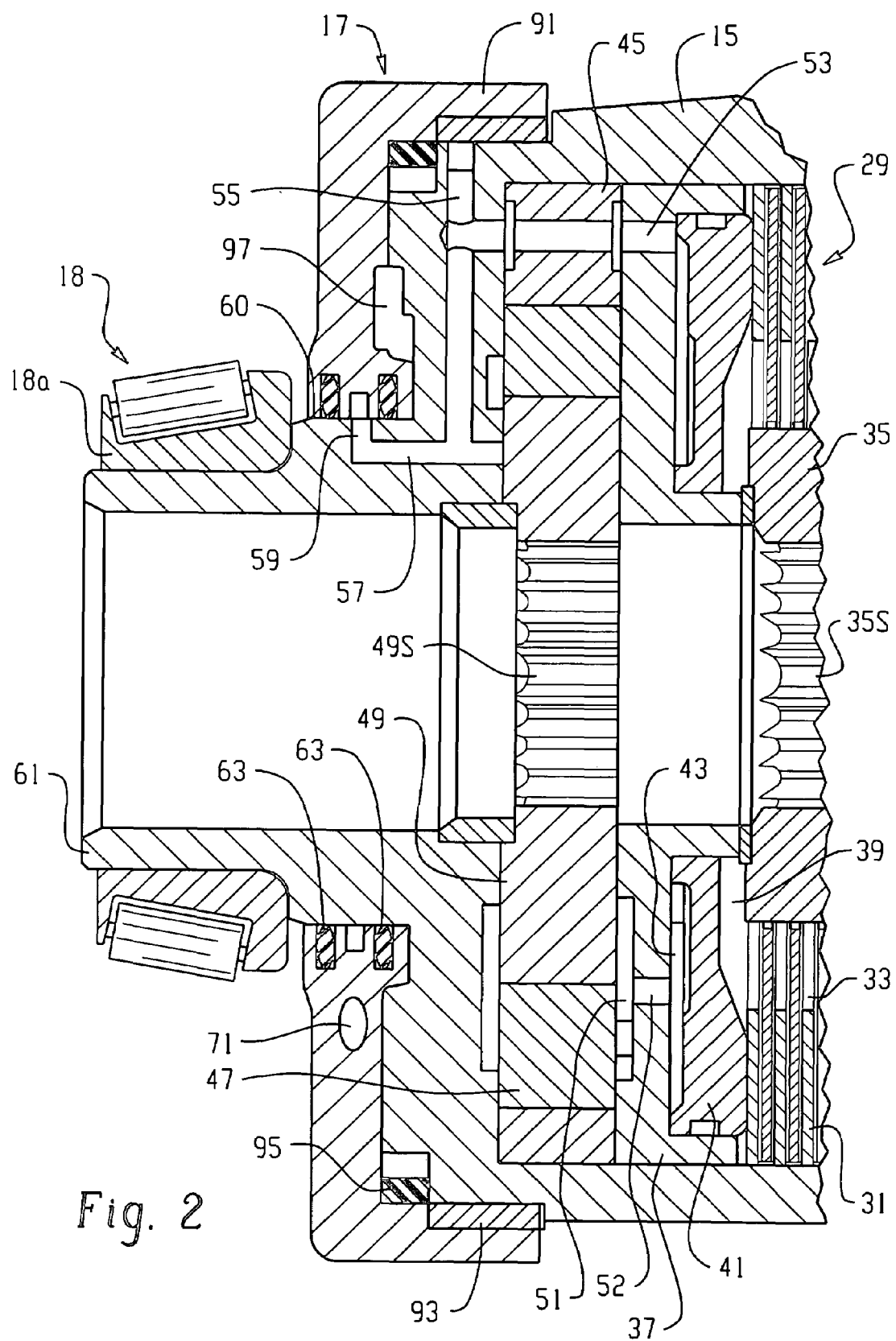
FIG. 2 is an enlarged, fragmentary, axial cross-section, similar to FIG. 1, illustrating in greater detail that portion of the coupling device with which the improved fluid pressure system of the present invention is most closely associated.

Referring still primarily to FIG. 1, there is disposed within the clutch housing 15 a clutch pack, generally designated 29 which, as is shown in greater detail in FIG. 2, comprises a plurality of outer discs 31 which are in splined engagement with a set of internal splines defined by the clutch housing 15. In addition, the clutch pack 29 includes a plurality of inner discs 33, which are interleaved with the outer discs 31 in a well known manner, the inner discs 33 being in splined engagement with a coupling member 35. The coupling member 35 defines a set of internal splines 35S, which are also in splined engagement with the left axle shaft, such that the coupling member 35 is fixed, in the subject embodiment, to rotate with the side gear 27, it being understood that such a spline arrangement, or even the coupling member 35 itself, is not essential to the present invention.

Also disposed within the clutch housing 15 is an annular housing insert 37 which cooperates with the adjacent coupling member 35, and with the clutch pack 29, to define a clutch cavity or clutch piston chamber 39. Disposed within the clutch piston chamber 39, and moveable axially therein, is a clutch piston 41 which cooperates with the housing insert 37 to define a piston pressure (apply) chamber 43, which may better be seen in FIG. 2. As is well known to those skilled in the art of such devices, variations in the fluid pressure in the piston pressure (apply) chamber 43 will result in variations in the axial force applied by the clutch piston 41 to the clutch pack 29 and therefore, will result in variations in the "bias torque", i.e., the torque transmitted through the clutch pack from the input of the coupling 11 to the output.

Referring now primarily to FIG. 2, also disposed within the clutch housing 15, and immediately to the left of the housing insert 37, is a gerotor gear set comprising a stationary, eccentric member 45, serving as part of the pump housing, an internally-toothed outer rotor 47, and an externally-toothed inner rotor 49. The inner rotor 49 defines a set of straight, internal splines 49S which are also in engagement with the left axle shaft, as described previously, such that the inner rotor 49 is fixed to rotate with the coupling member 35 and the side gear 27. As is now well known to those skilled in the art of such devices, during normal, straight-ahead operation, the entire differential coupling 11 rotates as a unit, i.e., the housings 13 and 15 and the side gears 25 and 27 and the axle shafts all rotate at the same rotational speed. In that condition, there is no relative rotation between the outer rotor 47 and the inner rotor 49, and therefore, there is no pumping of pressurized fluid from the volume chambers (formed between the teeth of the rotors 47 and 49 when they are relatively rotating).

As is also well known to those skilled in the art, based in part upon the teachings of the above-incorporated patents, when there is differentiation, i.e., when there is a difference in the speed of rotation between the left and right axle shafts, there will also, of necessity, be a speed difference between the input (housings 13 and 15 and pinion gears 21) and the output (the left axle shaft). That speed difference between the input and the output will result in the rotation of the left axle shaft driving the inner rotor 49 which, in turn, will drive the outer rotor 47, thus pumping pressurized fluid into an output chamber 51 from where it is communicated through an appropriate fluid port 52 in the housing insert 37, such that the pressurized fluid is communicated into the piston pressure apply chamber 43.

Referring still primarily to FIG. 2, the housing insert 37 cooperates with the eccentric member 45 and the clutch housing 15 to define an axial fluid passage 53 which is in open communication with the piston pressure apply chamber 43. The clutch housing 15 defines a radial fluid passage 55 which intersects the axial passage 53 and, at its radially inner extent, communicates with another axial fluid passage 57 which then, by means of a short radial fluid passage 59, communicates to an outer cylindrical surface 60 formed by a hub portion 61 of the clutch housing 15. The radial passage 59 forms a port in the outer cylindrical surface 60 of the hub portion 61, that port also, hereinafter, bearing the reference numeral "59". In the subject embodiment of the invention, but by way of example only, there are two each of the fluid passages 53, 55, 57, and 59, which would typically be disposed approximately 180 degrees apart, but in the subject embodiment, because of space limitations, are about twenty (20) degrees apart.

Figure 3:
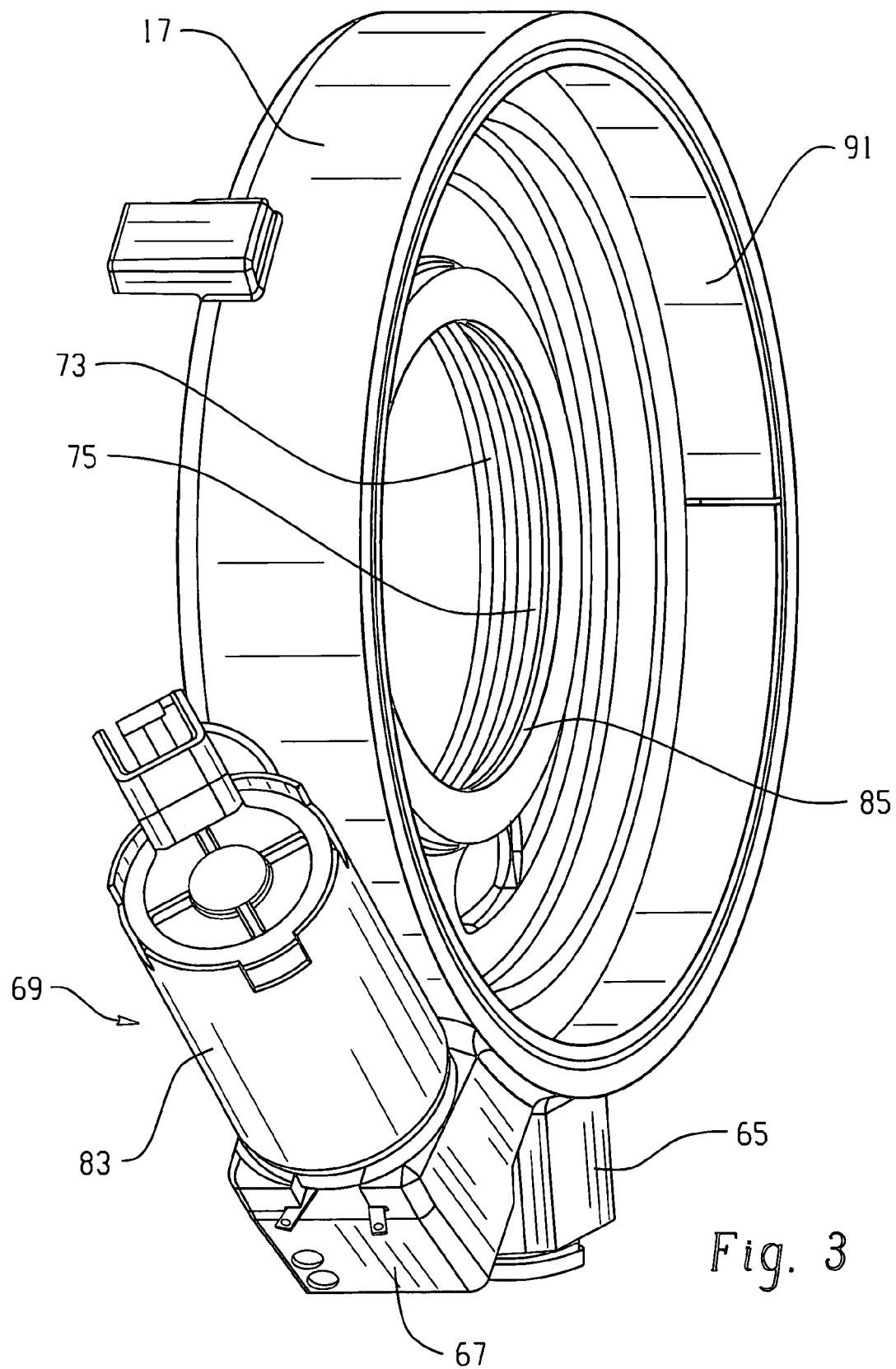
FIG. 3 is a perspective view of the control valve assembly, including the plenum member, of the coupling device shown in FIGS. 1 and 2, of the type including the subject embodiment of the invention.

Referring now primarily to FIGS. 2 and 3, it may be seen that the valve housing or control valve assembly 17, which preferably comprises a molded aluminum plenum member, is stationary within the outer differential housing (not shown herein). The valve housing 17 receives on its inner periphery, a pair of seal members, generally designated 63, which are disposed on axially opposite sides of the radial passage (port) 59, the seal members 63 being in sealing engagement against the adjacent, outer cylindrical surface 60 of the hub portion 61. As may best be seen in FIG. 3, the valve housing 17 includes an inlet portion 65 which, preferably, extends down into a "source" of low pressure fluid, which would typically comprise a reservoir or sump containing fluid and disposed within the outer differential housing, as is well known in the art.

The valve housing 17 (which will also be referred to hereinafter as the "plenum member 17") also includes a port portion 67 on which is mounted a pressure control valve assembly, generally designated 69, which is preferably made, and operates, in accordance with the teachings of co-pending application U.S. Ser. No. 10/795,651, filed Mar. 8, 2004 in the name of Christopher J. Babin, for a "Coupling Device and Improved Method of Controlling Torque Transmission", assigned to the assignee of the present invention and incorporated herein by reference. Thus, the control valve assembly 69 is preferably an electrical solenoid-operated valve, changing pressure in the piston pressure apply chamber 43 in response to changes in an electrical input signal. The plenum member 17 defines a generally radial passageway 71 (cut through at an angle to the plane of FIG. 2) which extends radially inward to be in continuous fluid communication with the radial passage and port 59. The radial passageway 71 has its radially outer end disposed within the port portion 67, and therefore, the radial passageway 71 is disposed adjacent the pressure control valve assembly 69. Thus, it may be seen that, at any given point in time, the fluid pressure in the passageway 71, which is effectively the "inlet" of the pressure control valve assembly 69, is substantially identical to the fluid pressure in the piston pressure apply chamber 43, by means of the fluid passages 53, 55, 57, and 59.

As was explained in the Background of the Disclosure, it has been conventional practice to form housing members of differentials and couplings devices, such as the clutch housing 15, as cast iron members. Then, certain surfaces, which could not function satisfactorily in the "as-cast" condition, would be machined, or further processed in some other manner. The outer cylindrical surface 60 of the hub portion 61 would be one such surface requiring further processing, but as was mentioned previously in the Background of the Disclosure, even with such further machining of the outer cylindrical surface 60, there has still been the observed problem of graphite porosity, and its undesirable interaction with, and effect upon, the seal members 63. Heat treating the cast iron hub portion was found to help somewhat, but the sealing life was still unsatisfactory.

Therefore, in accordance with an important aspect of the present invention, the clutch housing 15 is formed as a forged steel member. It will be understood by those skilled in the metallurgical arts that the use of a steel member (as opposed to a cast iron member) is preferred (as opposed to other, non-ferrous materials) for the combination of factors such as strength, machinability, and cost offered by steel. Furthermore, the member is described as preferably being a "forged" steel member primarily because of the known cost and strength benefits of a forging, as compared to a machined part. However, it should also be appreciated by those skilled in the art that all that is essential to the present invention is to provide a clutch housing 15 in which the outer cylindrical surface 60 of the hub portion 61 is substantially free of graphite porosity, which could be accomplished in a number of ways.

This desired result of eliminating graphite porosity could be accomplished, within the scope of the invention, by placing a wear sleeve about the hub portion 61, such that the outer surface of the wear sleeve would comprise the outer cylindrical surface 60. Theoretically, the wear sleeve could comprise any of the materials known for use in such applications, such as bronze, but in the subject embodiment, it was determined that bronze would be too soft, that the application is sufficiently severe to require a harder material, and a material such as steel would have to be utilized herein. However, those skilled in the art will also recognize that the use of a separate wear sleeve would require some arrangement for fixing the wear sleeve relative to the hub portion 61, and the wear sleeve would also have to be provided with one or more appropriate openings to form the ports, communicating with the radial fluid passages 59. It is also know to those skilled in the art that adding a wear sleeve, in an application such as the present invention, has the potential to introduce an additional leakage path. Therefore, in the subject embodiment, but by way of example only, the desired result is achieved by forming the clutch housing 15 as a forged steel member, then machining the outer cylindrical surface 60 of the hub portion 61. As is well know to those skilled in the sealing art, the best sealing arrangement is not necessarily achieved by providing the smoothest possible finish on the outer cylindrical surface 60, as will be described further herein.

Figure 4:
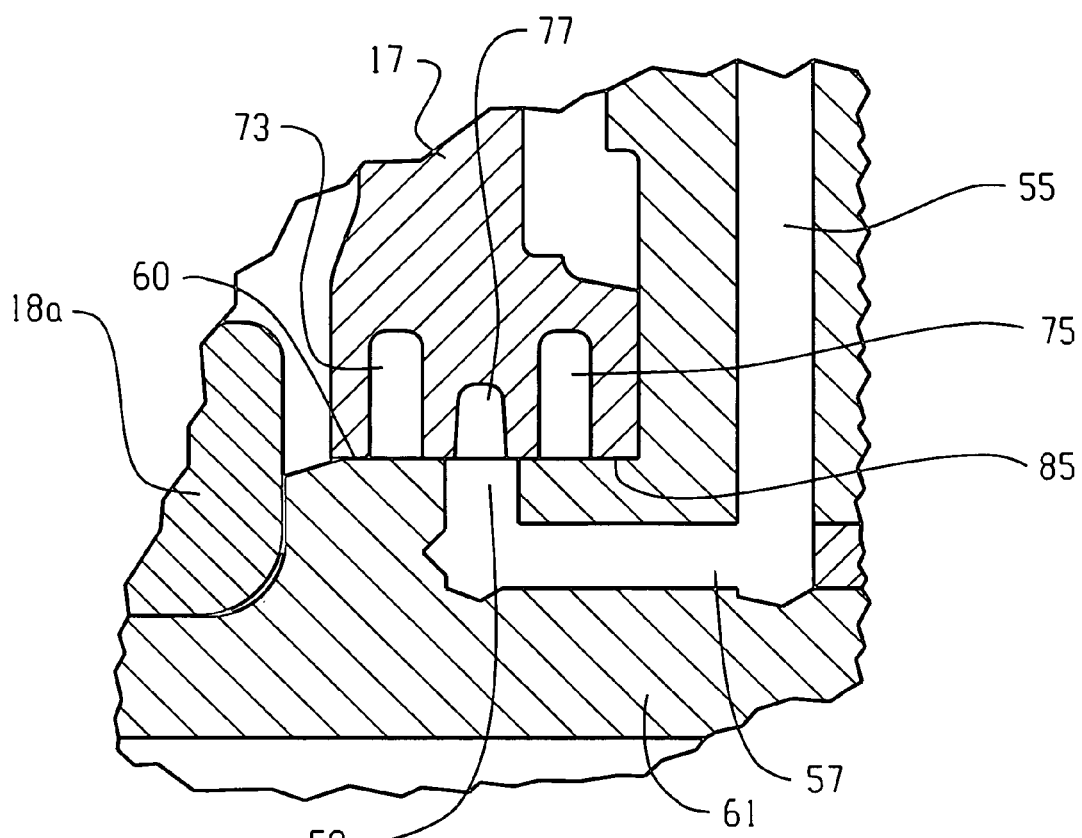
FIG. 4 is a further enlarged, fragmentary, axial cross-section similar to FIG. 2, illustrating in greater detail the seal assembly and hub portion of the present invention, but with the seals removed for ease of illustration.

Referring now primarily to FIG. 4, in conjunction with FIG. 2, the valve housing 17 comprises a molded aluminum plenum member defining a pair of annular seal cavities 73 and 75, disposed on axially opposite sides of the port 59, and preferably not in direct fluid communication therewith. Disposed axially between the seal cavities 73 and 75 is an annular fluid groove 77, which is annular to be in continuous fluid communication with the port 59, and is also in fluid communication with the radial passageway 71. Therefore, the fluid groove 77 will also be referred to hereinafter, and especially in the appended claims, as the "second port", communicating with the first port 59. Although not an essential feature of the invention, it has been determined that it is normally preferable for the groove 77 to be formed in the plenum member 17, rather than in the hub portion 61, because, if the groove 77 were formed in the hub portion 61, then during assembly, as the plenum member 17 is being placed over the hub portion 61, the seal member 63 which is disposed in the seal cavity 75 would have to "pass over" the groove, which could result in damage to the seal member. By locating the annular fluid groove 77 in the plenum member 17, the seal member 63 disposed in the seal cavity 75 merely has to pass over the ports 59, which presents much less potential for damage to the seal member.

Figure 5:
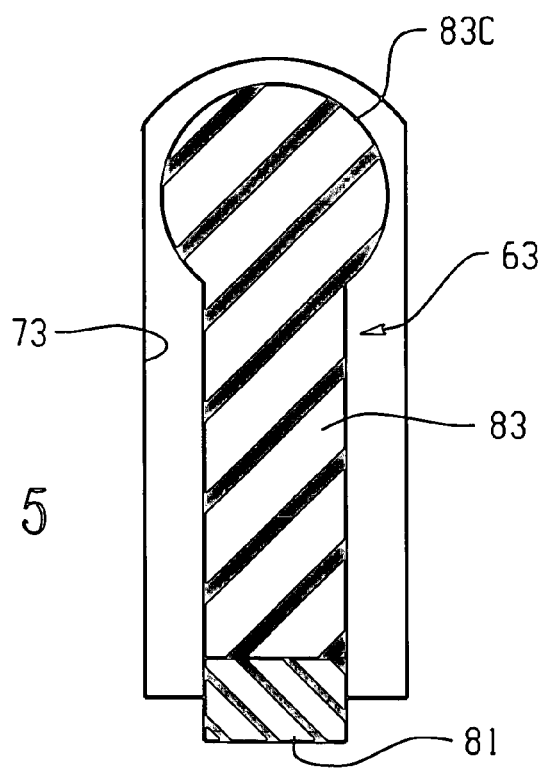
FIG. 5 is a further enlarged, somewhat pictorial view of one of the seal members utilized in the subject embodiment of the invention, with the seal member shown within its cavity, but in its "at-rest" condition (i.e., with the hub portion not present).

Referring now primarily to FIG. 5, one preferred embodiment of the seal member 63 will be described in some further detail. It should be understood that, although FIG. 5 shows the seal member 63 disposed in the seal cavity 73, the two seal members 63 and seal cavities 73 and 75 are preferably identical, to simplify machining and seal member inventory. In FIG. 5, it may be seen that the preferred embodiment of the seal member 63 includes a primary sealing element 81 and a secondary sealing element 83, which surrounds the primary sealing element 81. As is shown in FIG. 5, with the seal member 63 in its "at-rest" condition (i.e., without the hub portion 61 being disposed within the seal member 63), the primary sealing element 81 extends radially inward beyond an inner cylindrical surface 85 (see FIG. 4) defined by the plenum member 17.

In accordance with a preferred embodiment of the invention, but by way of example only, the primary sealing element 81 comprises a glass-filled, polytetrafluoroehtylene member (sold under the trademark "Teflon", owned by E. I. Dupont de Nemours and Company) suitable for sealing against a rotating metal surface, under high pressure, and in a high temperature environment. As was noted in the Background of the Disclosure, it is because of the need to use such a high pressure, high temperature sealing element, having glass fibers, that the basic "graphite porosity" problem apparently occurs.

The secondary sealing element 83 may comprise any of the well known elastomeric type materials, preferably a fluorocarbon, which are conventionally used, or which may be used, for sealing purposes. However, it should be recognized that, in the preferred embodiment, the sealing element 83 does not directly perform a sealing function relative to the surface 60 (although an enlarged circular portion 83C has an interference fit within the rounded portion of the seal cavity 73) and instead, the sealing element 83 is more of a "back-up ring" for the primary sealing element 81. In accordance with one important performance aspect of the present invention, the overall height (radial dimension) of the seal member 63 is selected, relative to the height of the seal cavity 73, and relative to the width of the sealing element 83, such that the radial sealing force exerted by the sealing element 81 against the hub portion 61 is within a predetermined range of forces. It is believed to be within the ability of those skilled in the art to make such a selection of the relative heights of the seal member 63 and the seal cavity 73, to get the predetermined, desired sealing force suitable for the range of pressures to which the seal member 63 will be subjected. The desired height to width (H/W) ratio for the seal member will be described in greater detail subsequently.

In accordance with another important performance aspect of the invention, the configuration of the seal member 63 (and more specifically, of the secondary sealing element 83) relative to the configuration of the seal cavity 73 has been selected to accomplish several objectives. First, the radially outermost portion 83C of the secondary sealing element 83 is generally rounded and is preferably larger than the adjacent portion of the seal cavity 73, such that, once installed and under fluid pressure, the seal member 63 will not rotate within the plenum member 17, but instead, the only relative rotation involving the seal will be between the seal member 63 and the outer cylindrical surface 60. The reason is to minimize seal drag, and the drag between the radially inner surface of the primary sealing element 81 and the surface 60 is much less than would be the drag between the element 83 and the cavity 73, if such rotation were permitted. Also, the material of the sealing element 81 is much better able to withstand such rubbing contact than is the sealing element 83.

The configuration of the seal member 63 is also selected such that, as the temperature in the region of the seal and hub increases, the secondary sealing element 83 may "expand" within the cavity 73. More specifically, the goal is that the configurations of the seal cavity 73 and the secondary sealing element 83 be selected such that, over the range of operating temperatures, the radial sealing force will remain approximately constant. It is believed to be within the ability of those skilled in the seal art, based upon a reading and understanding of the present specification, to select the configurations of the cavity 73 and the secondary sealing element 83 to achieve such a constant "Force vs. Temperature" relationship.

Referring again primarily to FIGS. 2 and 3, one final aspect of the first embodiment of the invention will be described. The valve housing (plenum member) 17 includes an outer cylindrical portion 91 surrounding an outer diameter formed on, and defined by the clutch housing 15. Disposed between outer diameter of the clutch housing 15 and the outer cylindrical portion 91 is, preferably, a bronze bushing 93, or some other suitable bearing or journal type member. Although this particular arrangement of the bushing 93, or even the basic presence of a bushing, is not essential to the invention, it has been determined through testing that the use of some sort of bearing arrangement between the clutch housing 15 and the plenum member 17 improves the ability to maintain concentricity between the outer cylindrical surface 60 and the inner cylindrical surface 85. Better concentricity between the surfaces 60 and 85 has been found to improve the durability of the sealing arrangement.

Disposed immediately adjacent the bronze bushing 93, and just slightly radially inward therefrom, is a low pressure seal 95, shown somewhat schematically in FIG. 2 as comprising an annular square-cut seal member, but from the early stages of development, a lip seal was utilized instead. The low pressure seal could comprise any of the conventional low pressure seal materials, such as a urethane, or a butyl rubber, but in the subject embodiment, it was found necessary to utilize materials such as liquid crystal polymers and fluoroelastomers, including Teflon. Neither the configuration nor the material of the low pressure seal 95, or even the presence of a low pressure seal are essential to the practice of the present invention. However, in the subject embodiment of the coupling device 11, fluid which is drawn into the coupling device through the inlet portion 65 is communicated into a low pressure reservoir 97, formed between the clutch housing 15 and the plenum member 17. Therefore, the low pressure seal 95 is necessary to prevent leakage of air radially inward between the clutch housing 15, the plenum member 17, and the bronze bushing 91, because such leakage of air would prevent the gerotor pump from building pressure in the chamber 43.

During assembly of the plenum member 17 and the seal members 63, it is necessary to prepare each seal member 63 by deforming it slightly radially inwardly at one location, so the seal member is no longer "circular", thus reducing temporarily the effective outer diameter of the seal member enough to be able to insert the seal member 63 into its respective seal cavity 73 or 75. Then, when the seal member has been inserted into its seal cavity, the seal member is worked into place within the seal cavity, and again made circular. As was mentioned previously, the height-to-width ratio ("H/W" ratio) of the seal member 63 must be selected to provide the desired radial force of the primary sealing element 81 against the surface 60, and during the course of developing the invention, the trend has been toward a greater interference fit between the inside diameter of the sealing element 81 and the outer cylindrical surface 60. However, in order to be able to accomplish the assembly method just described, it should be apparent that the H/W ratio must be selected such that it is possible to perform (and perhaps do so manually) the necessary deformation of the seal member, just prior to insertion into the seal cavity. By way of example only, the H/W ratio of the seal member 63, as shown in FIG. 5, is in the range of about 4:1.

After the plenum member 17 has been "assembled" by the insertion thereof of the two seal members 63 in the seal cavities 73 and 75, the plenum member 17 may be installed on the clutch housing 15. Noting that the primary sealing element 81 extends radially inward beyond the inner cylindrical surface 85, and thus, temporarily has a smaller inside diameter than the outer diameter of the surface 60, it will be appreciated that sliding the seal members 63 over the hub portion 61 is a delicate operation. Therefore, in accordance with one benefit of the invention, the length of the outer cylindrical portion 91 is selected such that, during assembly, with the plenum member 17 moving from a disassembled position to the right, toward the position shown in FIG. 2, the portion 91 begins to slide over the bronze bushing 93 before the seal member 63 in the seal cavity 75 begins to engage the outer cylindrical surface 60. In other words, the engagement of the outer cylindrical portion 91 "pilots" the plenum member 17 over the hub portion 61, to minimize the lack of concentricity between the outer surface 60 and the inner surface 85. As will be appreciated by those skilled in the sealing art, there is much less chance of damaging a seal member during the assembly process if the relevant surfaces are concentric.

As was mentioned previously, the best sealing arrangement is not necessarily accomplished by providing the smoothest possible surface finish for the surface against which the seal member seals. The clutch housing 15 was described as preferably being a steel forging. Typically, the outer cylindrical surface 60 would thereafter be machined, but the particular process used to finish the surface 60 of the hub portion 61 is not an essential feature of the invention. It has been observed that a very good sealing capability may be achieved, in terms of maintaining pressure, and long seal life, when the surface 60 has enough surface roughness that some oil is retained on the surface 60, which can lubricate the sealing element 81, rather than the surface 60 being "wiped dry" by its interaction with the sealing element 81. It has been observed during the development of the invention that, after the coupling device operates awhile, some of the polytetrafluoroehtylene (PTFE) material from the primary sealing element 81 may be transferred to the surface 60.

Figure 6:
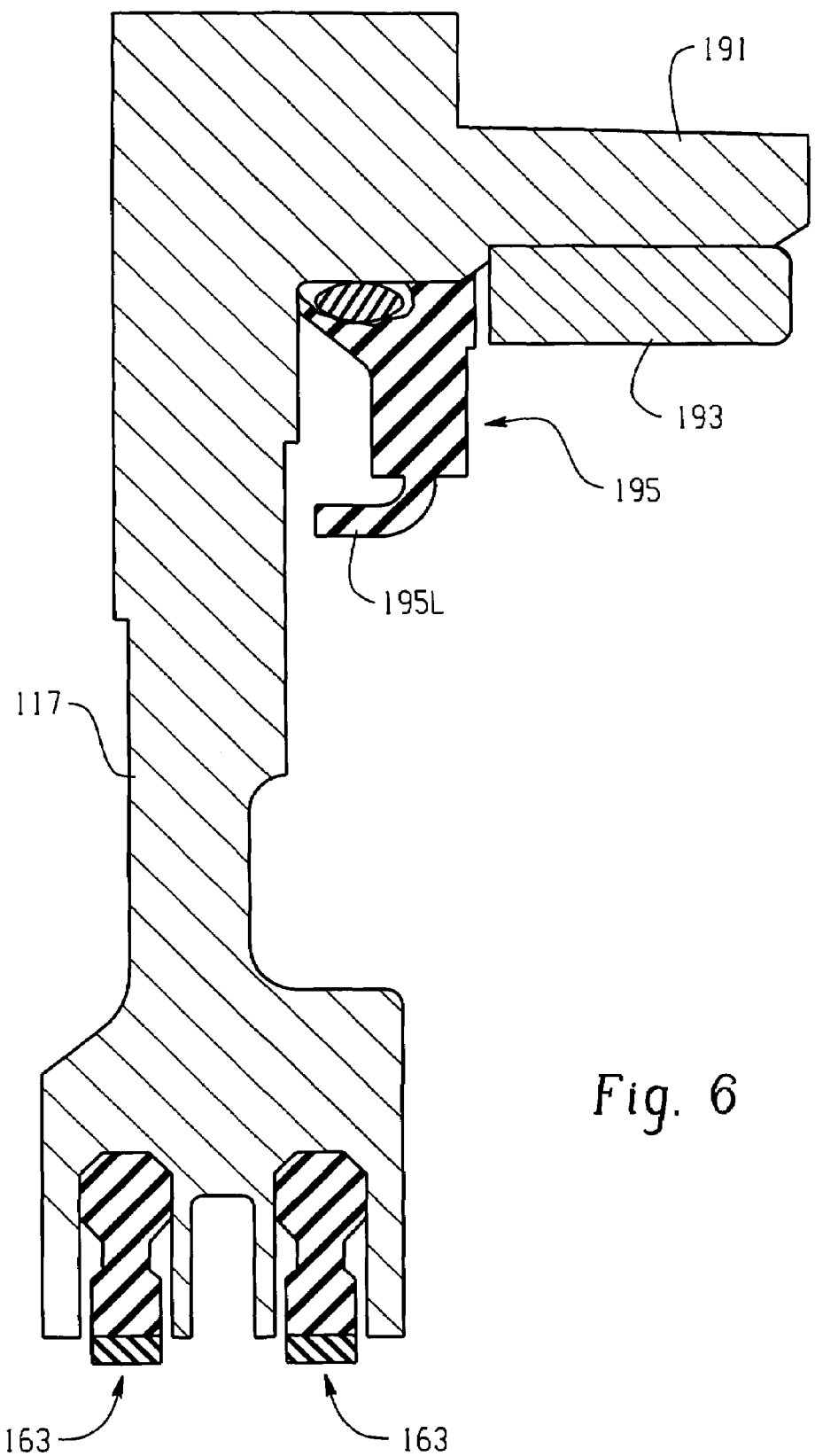
FIG. 6 is a further enlarged (relative to FIG. 2) axial cross-section (upper half only) of a plenum and seal assembly, illustrating an alternative embodiment of the present invention.
Figure 7:
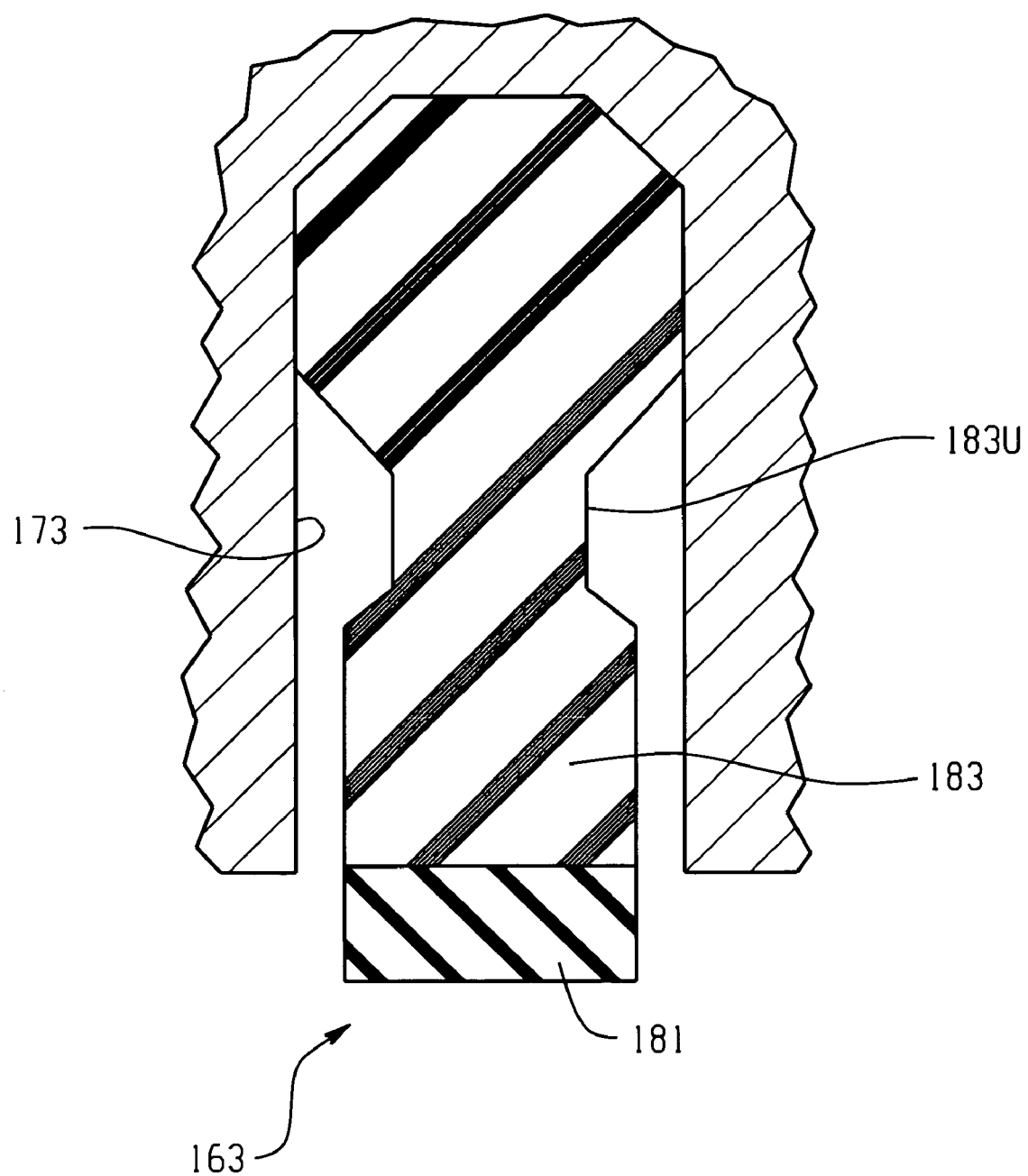
FIG. 7 is a greatly enlarged, fragmentary, axial cross-section of one seal member made in accordance with the alternative embodiment of FIG. 6, in its "at-rest" condition.

Referring now primarily to FIGS. 6 and 7, there is shown an alternative embodiment of the invention, in which the same or similar elements bear the same reference numerals, but incremented by "100", as in the embodiment of FIGS. 1 through 5. Thus, FIG. 6 shows a plenum member 117, which is configured slightly differently than the member 17, but such differences are irrelevant to the present invention. An outer cylindrical portion 191 of the plenum member 117 has disposed therein a bronze bushing 193, and disposed to the left of the bushing 193 is a low pressure seal assembly 195, including a lip portion 195L which would ride on an adjacent outer surface of the clutch housing 15 to prevent the ingress of air, as mentioned previously. Thus, the low pressure seal 195 in the alternative embodiment may have a somewhat lower seal drag than would the seal 95 in the first embodiment.

Referring now primarily to FIG. 7, there is disposed in a seal cavity 173 a seal member generally designated 163. As in the first embodiment, the seal member 163 comprises a primary sealing element 181 and a secondary sealing element 183, and the sealing elements in this embodiment may comprise the same materials as in the first embodiment. The secondary sealing element 183 includes a radially outward, enlarged portion which serves the same purpose as previously described, i.e., to retain the seal member 163 to be non-rotatable within the seal cavity 173. One difference in the sealing element 183 is that the portion immediately radially outward of the element 181 is relatively wider than in the case of the element 81, but also, the element 181 is provided with a chamfer or undercut, designated 183U. It has been determined through testing that the undercut portion 183U is very effective in achieving the desired springiness of the element 183, to get the desired constant radial force of the primary sealing element 181 against the surface 60. The undercut portion 183U also provides a flexibility of the element 181 which is helpful during the assembly process. Finally, the undercut portion 183U allows enough room for thermal expansion of the secondary sealing element 183, within the seal cavity 173, so that the thermal expansion does not cause excessive radially-inward loading on the primary sealing element 181.

In the first embodiment, the H/W ratio of the seal member 63 was stated to be about 4:1. In the alternative embodiment, the H/W ratio of the seal member 63 (i.e., the overall height of the elements 181 and 183 together, in the at-rest condition) is about 3.2:1. Therefore, it may be stated that the H/W ratio of the seal member is preferably in the range of about 2.5:1 to about 5:1, but is even more preferably in the range of about 3:1 to about 4:1. A seal member within that H/W ratio will, in most applications, provide a good balance between the ability to install the seal member in the seal cavity and the radial sealing force exerted against the adjacent outer surface 60, even over a range of operating temperatures.

The present invention has been illustrated and described in connection with a high pressure sealing arrangement utilizing two of the "radial" type seal members, 63 and 163. However, it should be understood that it is not essential to the practice of the present invention to have the high pressure region defined by, and between, a pair of the radial type seal members, although it is preferred because the use of the two radial seals as shown herein eliminates any net axial biasing force acting on the plenum member 17, as the pressure of the high pressure fluid varies.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A coupling device including a rotatable housing defining a clutch cavity; a clutch assembly disposed in said clutch cavity and including a first clutch member fixed to rotate with said housing, and a second clutch member fixed to rotate with an output; said housing defining a pressure chamber, and a clutch apply member disposed in said pressure chamber and being operable to bias said first and second clutch members into torque-transmitting relationship in response to the presence of pressurized fluid in said pressure chamber; said coupling device including a source of said pressurized fluid, and a control valve assembly operable to vary the fluid pressure in said pressure chamber in response to variations in an input;
    said housing defining a hub portion defining an outer cylindrical surface, said housing defining a high pressure fluid passage providing fluid communication from said pressure chamber to a first port formed in said outer cylindrical surface; characterized by:
    (a) a stationary plenum member defining an inner cylindrical surface disposed in a surrounding relationship about said outer cylindrical surface defined by said hub portion;
    (b) said plenum member defining a high pressure fluid passage providing fluid communication from a second port formed in said inner cylindrical surface, in fluid communication with said first port formed in said outer cylindrical surface, to said control valve assembly; and
    (c) first and second annular seal members disposed within said inner cylindrical surface on axially opposite sides of said second port, to define an annular pressure region; and
    (d) said hub portion of said housing comprising a member in which at least said outer cylindrical surface is substantially free of graphite porosity.

2. A coupling device as claimed in claim 1, characterized by said control valve assembly being mounted on said plenum member and including an electromagnetic coil, and said input comprises an electrical input signal.

3. A coupling device as claimed in claim 1, characterized by said stationary plenum member comprises a molded aluminum member including an outer cylindrical portion disposed about a bearing diameter of said rotatable housing and including a low pressure seal disposed therebetween.

4. A coupling device as claimed in claim 3, characterized by said coupling device being intended for eventual installation within an outer housing containing a reservoir of fluid, said plenum member including an inlet portion adapted to project downward into said reservoir of fluid.

5. A coupling device as claimed in claim 4, characterized by said housing and said plenum member cooperating to define a low pressure reservoir, said plenum member defining a low pressure fluid passage providing fluid communication from said inlet portion to said low pressure reservoir.

6. A coupling device as claimed in claim 1, characterized by said hub portion of said housing comprising a forged steel member.

7. A coupling device as claimed in claim 1, characterized by said first and second annular seal members each comprising a primary sealing element in contact with said outer cylindrical surface of said hub portion, said primary sealing element including glass fibers.

8. A coupling device as claimed in claim 1, characterized by said first and second annular seal members each comprising a secondary sealing element surrounding said primary sealing element.

9. A coupling device including a rotatable housing defining a clutch cavity; a clutch assembly disposed in said clutch cavity and including a first clutch member fixed to rotate with said housing, and a second clutch member fixed to rotate with an output; said housing defining a pressure chamber, and a clutch apply member disposed in said pressure chamber and being operable to bias said first and second clutch members into torque-transmitting relationship in response to the presence of pressurized fluid in said pressure chamber; said coupling device including a source of said pressurized fluid, and a control valve assembly operable to vary the fluid pressure in said pressure chamber in response to variations in an input;

said housing defining a hub portion defining an outer cylindrical surface, said housing defining a high pressure fluid passage providing fluid communication from said pressure chamber to a first port formed in said outer cylindrical surface; characterized by:
- (a) a stationary plenum member defining an inner cylindrical surface disposed in a surrounding relationship about said outer cylindrical surface defined by said hub portion;
- (b) said plenum member defining a high pressure fluid passage providing fluid communication from a second port formed in said inner cylindrical surface, in fluid communication with said first port formed in said outer cylindrical surface, to said control valve assembly; and
- (c) a first annular seal member disposed within said inner cylindrical surface adjacent said second port, to define an annular pressure region; and
- (d) said first annular seal member being disposed in a seal cavity and having a radial height H, greater than the radial dimension of said seal cavity, and an axial width W less than the axial width of said seal cavity, wherein said height H and said width W are selected such that said first seal member has a H/W ratio in the range of about 2.5:1 to about 5:1.

10. A coupling device as claimed in claim 9, characterized by said H/W ratio is in the range of about 3:1 to about 4:1.

11. A coupling device as claimed in claim 9, characterized by a second annular seal member disposed within said inner cylindrical surface on the axially opposite side of said second port from said first seal member, said first seal member and said second seal member cooperating to define said annular pressure region.

12. A coupling device as claimed in claim 11, characterized by said second annular seal member being disposed in a seal cavity and having a radial height H, greater than the radial dimension of said seal cavity, and an axial width W less than the axial width of said seal cavity, wherein said height H and said width W are selected such that said first seal member has a H/W ratio in the range of about 2.5:1 to about 5:1.

* * * * *